Jan. 2, 1934.   H. H. VAIL   1,941,588
AUTOMATIC CLUTCH MECHANISM
Filed Aug. 16, 1928   3 Sheets-Sheet 1
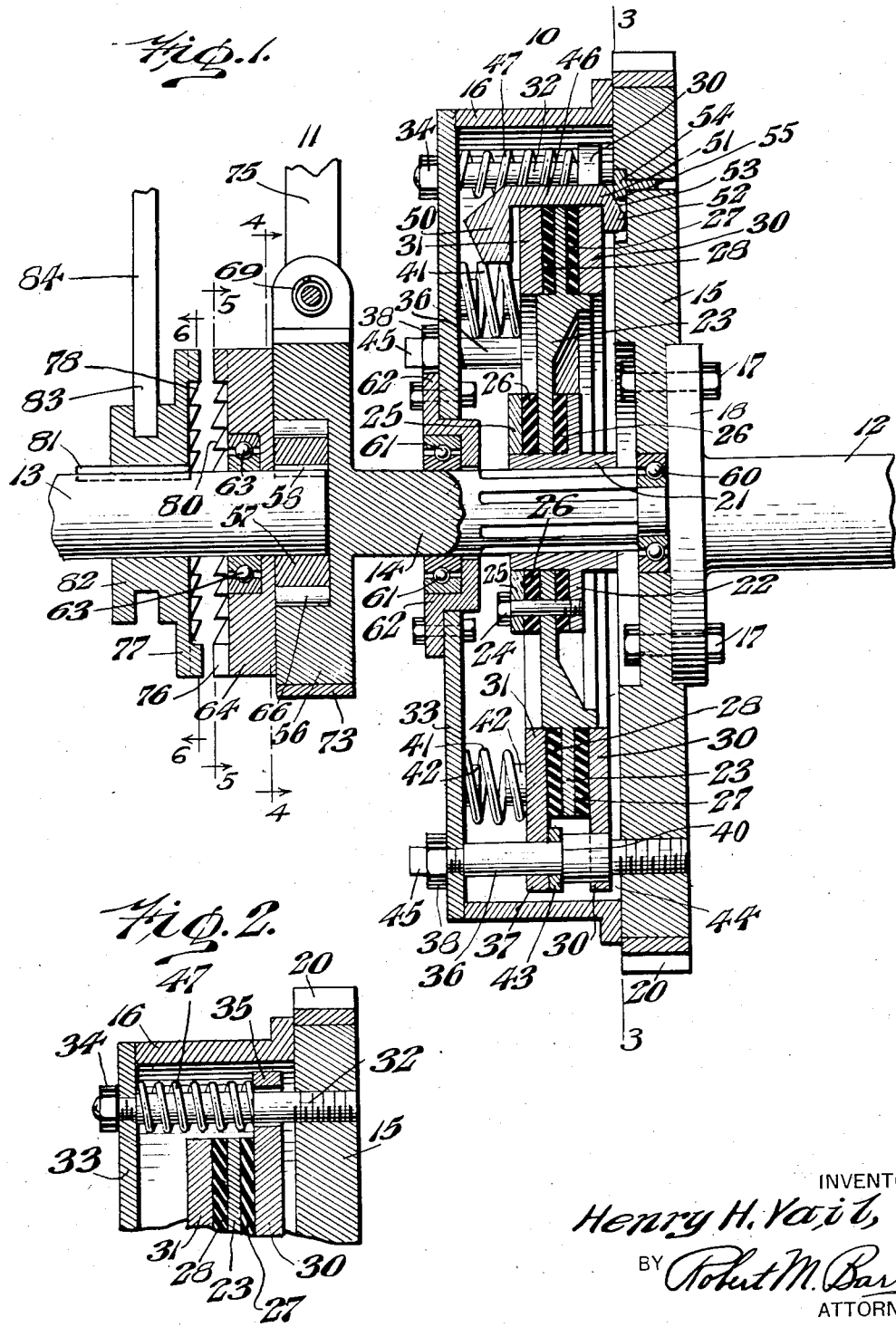
INVENTOR
Henry H. Vail,
BY Robert M. Barr
ATTORNEY.

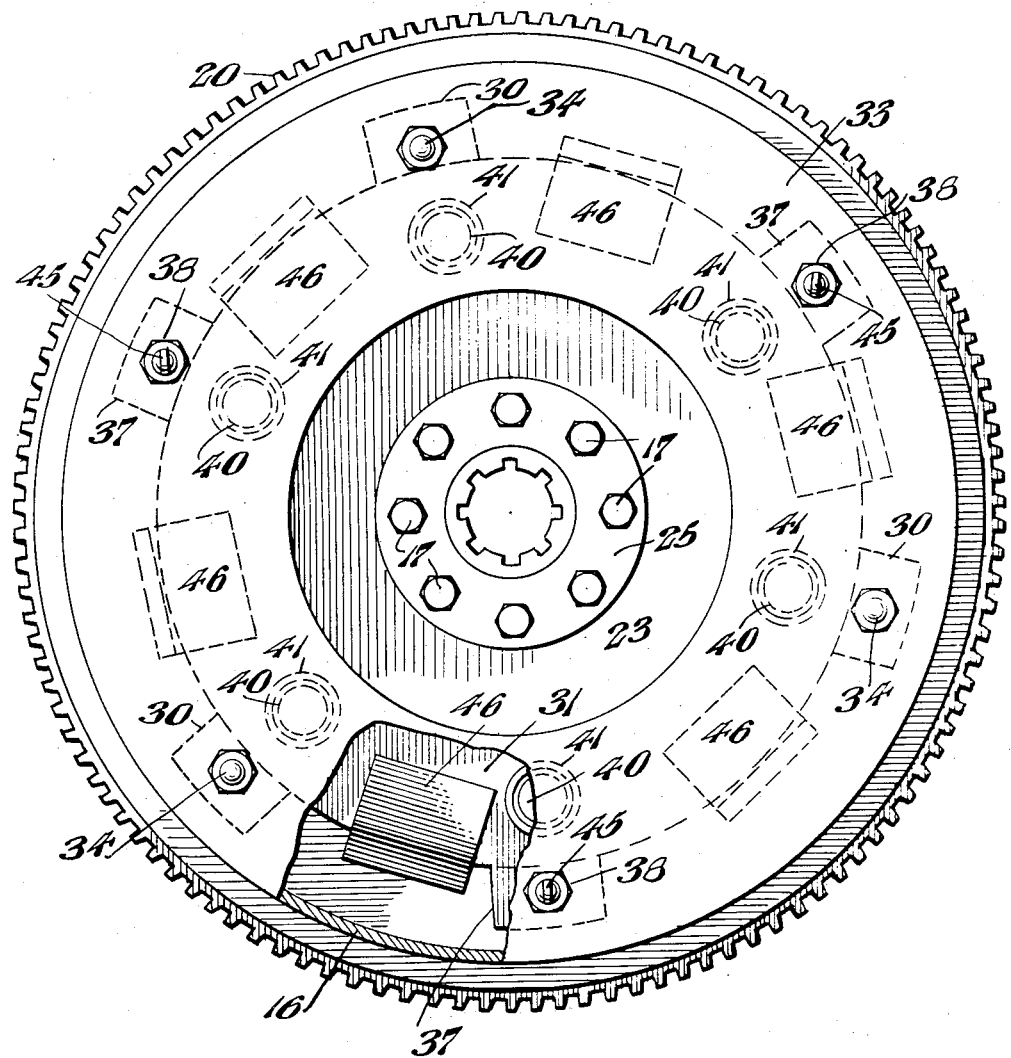

Jan. 2, 1934.  H. H. VAIL  1,941,588
AUTOMATIC CLUTCH MECHANISM
Filed Aug. 16, 1928   3 Sheets-Sheet 3
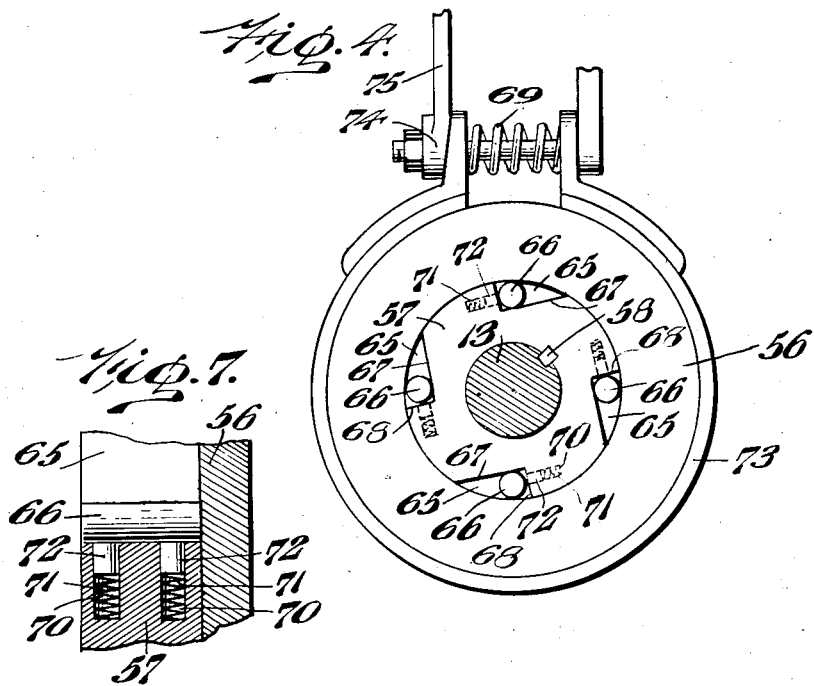
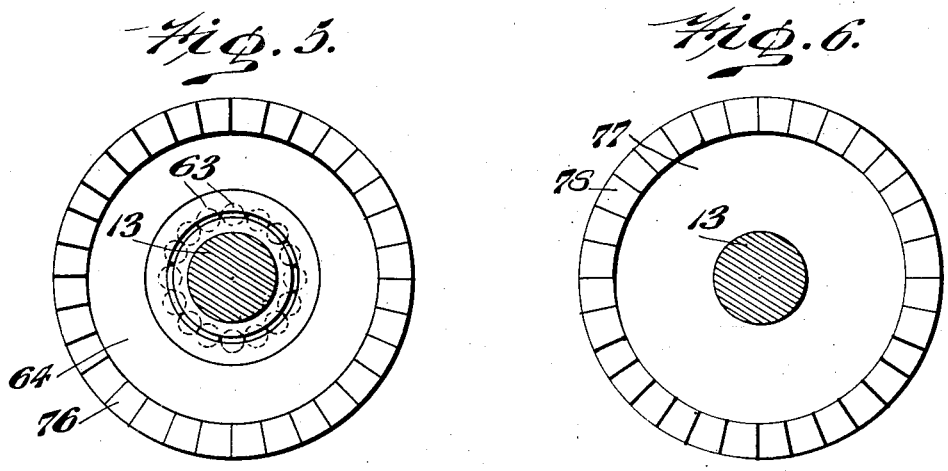
INVENTOR:
Henry H. Vail,
BY Robert M. Bass.
ATTORNEY.

Patented Jan. 2, 1934

1,941,588

UNITED STATES PATENT OFFICE 1,941,588

AUTOMATIC CLUTCH MECHANISM

Henry H. Vail, Camden, N. J., assignor to Automatic Drive and Transmission Company, Gloucester City, N. J., a corporation of New Jersey Application August 16, 1928. Serial No. 299,901

6 Claims. (Cl. 192—48)

The present invention relates to power transmitting mechanism and more particularly to an automatic clutch for controlling motion as transmitted from a driving element to a driven element.

In present day motor vehicle construction it is general practice to couple the engine or driving shaft to the driven shaft by means of a friction clutch, and to proportion the power transmitted to the traction wheels by means of a transmission gearing which is arranged to be manually controlled. Thus to vary the speed ratios, the transmission gear ratio is changed by manual operation of a gear shift lever while previously or simultaneously the friction clutch is manually released or declutched so as to relieve the transmission gears of the inertia of the engine and its associated parts. In such mechanisms, the transmission gearing can only run free when the power transmitting friction clutch is manually released.

Some of the objects of the present invention are to provide a clutch mechanism wherein manual declutching is unnecessary in order to shift a gear transmission from one speed ratio to another; to provide an automatic clutch mechanism for connecting a driving member to a driven member wherein a manually operable clutch pedal is dispensed with; to provide means in conjunction with a friction clutch for providing relative movement between a driving member and a driven member while said members are under the control of said friction clutch; to provide means for automatically causing a driven member to become disconnected from a driving member when the speed of rotation of said driven member tends to exceed the speed of said driving member; to provide a device for reducing the speed of rotation of a driving member and automatically causing the driven member to maintain its speed of rotation as an independent unit while the friction clutch remains in clutched condition; to provide an automatic mechanism wherein the transmission gearing and associated parts can be released for coasting while the friction clutch connecting the driving shaft to the driven shaft remains in clutched condition; to provide a supplemental control for a clutch mechanism wherein coasting of the transmission parts of a vehicle is controlled at will; to provide means wherein an automatic clutch control between a driving member and a driven member is rendered ineffective and a positive connecting means substituted; and to provide other improvements as will hereinafter appear.

In the accompanying drawings, Fig. 1 represents a longitudinal section of an automatic clutch control embodying one form of the present invention; Fig. 2 represents a detail in section of a part of the automatic friction clutch; Fig. 3 represents a section on line 3—3 of Fig. 1; Fig. 4 represents a section on line 4—4 of Fig. 1; Fig. 5 represents a section on line 5—5 of Fig. 1; Fig. 6 represents a section on line 6—6 of Fig. 1, and Figure 7 is a detail sectional view of the overrunning clutch showing the clutch rollers and their actuating springs.

Referring to the drawings, one form of the present invention consists generally of an automatic clutch control comprising two clutch units 10 and 11 interposed between a driving shaft 12 and a driven shaft 13 whereby motion is transmitted from one shaft to the other through the control mechanism of the present invention. The driving shaft 12 receives its motion from an engine, here deemed unnecessary to illustrate, and the driven shaft 13 transmits motion to a variable speed transmission, also not illustrated because it may be of any construction suitable for the purpose. A supplemental shaft 14 is arranged between the clutch units 10 and 11 for the purpose of transmitting motion of the former to the latter and thus finally energizing the driven shaft 13.

For transmitting the motion of the driving shaft 12 to the supplemental shaft 14, the clutch unit 10 is employed and consists of an automatically operable device wherein the clutching effort bears a definite relation to the speed of the driving shaft 12. In the form of the invention, here used by way of example, this clutching device comprises a fly-wheel disc 15 and housing 16 attached thereto forming the fly-wheel structure secured by bolts 17 to a flange 18 fast to the driving shaft 12. The disc 15 is also employed as a gear for cooperating with a starting motor gear, (not shown), and to that end has gear teeth 20 cut in its periphery. The supplemental shaft 14 carries a hub 21 mounted thereon in splined relation, so that it can move axially and relative to the shaft 14, and formed with a circumferential flange 22 serving as a backing plate against which a clutch plate 23 is rigidly held by bolts 24 passing through a clamping ring 25. Preferably gaskets 26 are interposed respectively between the sides of the plate 23 and the flange 22 and ring 25. The clutch plate 23 is circumferentially recessed at opposite sides to respectively seat annular discs 27 and 28 formed of wear-resisting friction material and arranged respectively juxtaposed to a movable clutching ring plate 30 and a backing ring plate 31. Thus the clutch plate 23, and the two discs 27 and 28 lie between the plate 30 and ring 31 and hence movement of the plate 30 towards the ring 31 causes the desired frictional clutching through the discs 27 and 28 to transmit motion from the plate 23 to the supplemental driven shaft 14.

For transmitting the rotary motion of the fly-wheel disc 15 to the movable clutch plate 30, a plurality of bolts 32 are threaded into the disc 15 at suitable locations, and in the present instance are shown having their outer ends passing through the housing end cover 33 which is thus clamped in place over the open end of the housing 16 by nuts 34. The clutch plate 30 is provided with apertured ears 35 for the passage of the respective bolts and just enough clearance is provided for free sliding movement of the plate 30 axially along these bolts 32.

For transmitting the rotary motion of the fly-wheel disc 15 to the ring plate 31, axially adjustable posts 36 are threaded into the disc 15 at suitable distances apart passing through ears 37 on ring plate 31 and projecting through the housing end plate 33 to receive nuts 38. These posts 36 are radially located beyond the periphery of the clutch plate 23 so as not to interfere with its operation. Each post 36 at the same distance from an end is provided with a shoulder 40 which serves as an abutment and limit stop for the backing ring 31 which is held against the shoulders 40, to resist the clutching pressure of the plate 30, by coil springs 41. These springs 41 are held under compression between the backing ring 31 and the housing end cover 33 and are prevented from springing out of position by studs 42 projecting respectively from the faces of the two plates 31 and 33. Preferably, washers 43 are interposed between the backing ring 31 and the respective shoulders 40. In connection with the posts 36, it should be noted that the initial setting of the backing ring 31 is made so as to leave a clearance 44 between the shoulder of the post and the fly-wheel disc in order that adjustment can be made in case of wear between the clutch faces. To readily turn the posts 36 to make this adjustment, the projecting end of each is squared as shown at 45 to receive a wrench or other tool. Thus in adjusted position, the backing ring 31 is held spring pressed against the post shoulders 40 and in such close proximity to the face of the disc 28 that a relatively slight linear movement of the latter will cause frictional contact between the parts.

For the purpose of automatically shifting the clutch ring plate 30 to produce a frictional gripping which is proportioned to the speed of rotation of the driving shaft 12, a plurality of centrifugally operated weights 46 are provided, six being here shown and arranged at equi-spaced distances about the circumference of the fly-wheel disc 15. The ring plate 30 is normally held in its declutched position by the provision of coil springs 47, which respectively encircle the bolts 32 and are compressed between one face of the plate 30 and the inner face of the housing cover 33. In addition to pressing the plate 30 to declutched position, these springs also maintain the centrifugal weights 46 in non-operating position at idling speeds and thus ensure non-engagement of the clutch except under operating load conditions. Each of these weights 46 consists of a weight head 50, a body 51 and an offset tail-piece 52, the distance between the head 50 and tail-piece 52 being such as to allow the weight to fit over the combined rim formed by the plates 30 and 31, the clutch plate 23 and friction discs 27 and 28. The inner face of the fly-wheel disc 15 is provided with a plurality of bearing sockets 53 so spaced as to receive the respective tail-pieces 52, while studs 54 are respectively secured to the disc 15 in position to form fulcrum edges 55 for the respective weights 46. In assembled condition, each weight body 51 lies close to the rim of the plate structure while its tail-piece 52 rests against a face of the ring plate 30, being so held by the position of the fulcrum stud 54. Also that portion 56 of the tail-piece 52 which engages the fulcrum edge 55 is of arcuate shape to permit the free swing of the weight 46. The initial adjustment of the clutch plates is such that at idling speeds of the motor the pressure of the weights 46 is insufficient to produce friction for power transmitting purposes. However, when the motor attains the speed necessary for running conditions, the weight heads 50 swing outwardly to thereby rock the tail-pieces 52 in the direction to press and hold the clutch plate in clutching and power transmitting relation with the driven clutch plate parts.

In order to connect the supplemental shaft 14 to the driven shaft 13 so that the latter may be either driven direct from the shaft 14 or have a motion independent thereof, the clutch unit 11 is provided, and in the present instance this consists of a cylindrical tubular clutch casing 56 encircling a driven rotary clutch member 57. The casing 56 is attached coaxially to the supplemental shaft 14 being here shown as an integral part thereof while the clutch member 57 and driven shaft 13 are connected by a key 58 in order to rotate together. The shaft 14 is journalled at one end in a ball bearing 60 provided axially of the fly-wheel disc 15, while at the other end it is journalled in a like bearing 61 mounted in the main housing 62. This bearing 61 supports the clutch casing 56 at one side while its other side is supported in a ball bearing 63 carried by the driven shaft 13. This bearing 63 is mounted in a face plate 64 which is bolted or otherwise secured to the open side of the casing 56 in order to retain the clutch member 57 in its operative position. The connection between the clutch casing 56 and the clutch member 57 is an over-running one consisting of a plurality of recesses 65 extending transversely of the periphery of the member 57 and respectively containing rollers 66. Each recess 65 has its bottom surface 67 inclined towards the periphery of the member 57, while the end wall 68 has a depth substantially equal to the diameter of the contained roller 66. This end wall 68 of each recess has two holes 70 spaced adjacent the respective ends of the rollers 66 and each contains a coiled spring 71 pressing a follower 72 against the roller 66. Thus as each roller 66 is simultaneously acted upon by like springs pressing it away from the end wall of its recess 65 it will move evenly in the recess without binding. Preferably the rollers 66 are of hardened steel to withstand the frictional clutching action. It will thus be apparent since the rollers 66 are pushed towards the inclined surfaces of the recesses that any relative motion of the clutch casing 56 and the clutch member 57 causes the rollers 66 to either roll up the inclined surfaces and lock the two parts together or to move in the other direction and release the driving and driven members. Thus the clutch unit 11 is mounted, constructed and arranged so that when the rotational speed of the supplemental shaft 14 exceeds the speed of the driven shaft 13 the rollers 66 will roll up the inclined surfaces if the recesses 65 and lock the parts together to transmit motion to the driven shaft 13 and to the transmission, but when the speed of the driven shaft 13 exceeds the speed of the shaft 14 then the rollers 66 automatically release and allow the driven shaft 13 to run free and disconnected from the shaft 14. This latter is an important feature of the invention because thereby the transmission is relieved of the torque and inertia of the fly-wheel and associated parts of the engine shaft 12 and gear shifting can take place without strain on any of the parts, without gear clashing, and without appreciable effort.

For the purpose of reducing the speed of the shaft 14 below the speed of the shaft 13 at will, the clutch casing 56 is encircled by a brake band 73 which is mounted to be normally out of engagement with the periphery of the casing 56 by a coil spring 69 but can be clamped thereto by means of a cam 74 operated by a brake pedal member 75. This latter may be brought to a position for convenient operation by locating it in the place usually occupied by the clutch pedal on a motor vehicle since such clutch pedal is dispensed within the mechanism of the present invention. Thus by operating the pedal member 75, motion is transmitted to tighten the brake band 73 upon the casing 56 so that the speed of the shaft 14 is reduced according to requirements or may be brought entirely to rest if desired. When this braking action takes place, the transmission and driven shaft 13 are released from the engine parts and gear shifting is freely possible to any position.

Where it is desired to prevent coasting of the transmission end of the mechanism, and for example in using the engine compression for braking purposes, an auxiliary clutch is provided consisting, in the persent instance, of two rings 76 and 77 having saw toothed faces 78 and 80 arranged to be interengaged to drive from one ring to the other. The ring 76 is fast to the face plate 64 in co-axial relation and has its toothed face 80 juxtaposed with respect to the toothed face 78 of the ring 77 which latter is secured by a key 81 to the shaft 13 so as to rotate therewith while capable also of sliding axially thereof. The teeth on the respective faces 78 and 80 are so arranged that when in mesh a clutching action takes place only when the speed of rotation of the transmission shaft 13 exceeds the speed of the shaft 14. This clutching action directly connects the clutch casing 56 with the shaft 13 and, therefore, the clutch unit 11 is without effect. When the speed of the clutch casing 56 and shaft 14 tends to exceed the speed of the shaft 13, the clutch faces 78 and 80 are automatically thrown out of mesh and then the clutch unit is restored as a control for transmission release and coasting. A shifting collar 82 is fixed to the clutch ring 77 and is engaged by the fork 83 of a shifting lever 84 which is located at a convenient place for manual operation.

In describing the operation of the automatic control, motion of the parts will first be followed through the clutch unit 10, and it will therefore be seen from Fig. 1 that the fly-wheel disc 15 is driven by the driving shaft 12 and transmits rotary movement to the ring plate 30 through the bolts 32, and to the plate 31 through the posts 36 as well as to the weights 50 which are pivoted in the fly-wheel structure. When the engine speed reaches that necessary for running conditions, the centrifugal effort of the weights 50 overcomes the action of the springs 47 and so shifts the clutch plate 30 to the left in an axial direction as seen in Fig. 1, so that it not only contacts with the friction disc 27 but causes the clutch plate 23 to also move in the same direction and thereby bring the friction disc 28 into frictional engagement with the backing plate 31. In this way, the parts of the clutch plate 23 are frictionally clamped between the plates 30 and 31 so that their motion is transmitted to drive the supplemental shaft 14. Thus the speed of the motor bears a direct relation to the clutching action transmitted by the action of the centrifugal weights 50 and yet there is not such a positive drive as requires shifting to a lower gear ratio where the road resistance is greater than the engine torque. Where the road resistance tends to exceed the developed torque, the decreased speed of the clutch parts will cause a slipping between the clutch plates until the engine speed is increased to take care of the added road resistance. It will thus be evident that the clutch unit 10 provides for automatically transmitting the motion of the driving shaft to the supplemental driven shaft 14 in ratios having a direct relation to the speed of the engine and to the road resistance.

Under ordinary running conditions, the auxiliary manually controlled clutch rings 76 and 77 are out of engagement and therefore motion transmitted to the supplemental shaft 14 is transmitted to the driven shaft 13 through the one-way clutch 56 and 57 and this is so arranged and constructed that when the rotational speed of the shaft 14 tends to be greater than the rotational speed of the driven shaft 13 there will be a direct drive from one to the other by reason of the clutch rollers 66 acting to grip the two parts of the clutch together. When, however, the rotational speed of the driven shaft 13 exceeds the speed of the supplemental shaft 14 then the action is to release the clutch rollers 66 from the casing 56 so that the driven shaft and its associated parts run free and independently of the supplemental shaft 14. By the provision of the manually controlled braking device 73 the speed of the supplemental driven shaft 14 can be controlled at will and hence provides a control whereby the free running of the driven shaft 13 can take place whenever it is desired that it should. At such times as the driven shaft 13 runs faster than the shaft 14 and freely relative thereto, it will be seen that the variable speed transmission is relieved of the inertia of the engine and its associated parts.

Where it is desired to prevent the driven shaft 13 from running free relative to the shaft 14, as for example when the engine compression is used for braking purposes, the clutch parts 76 and 77 are thrown to engaging position and hence the driven shaft 13 is prevented from running faster than the shaft 14 by the interlocking contact of the clutch, though should the speed of the supplemental shaft 14 exceed that of the driven shaft 13 then the clutch parts 76 and 77 will be automatically forced out of engagement, by virtue of the camming action of their respective teeth.

Having thus described my invention, I claim:

1. A power transmitting mechanism comprising a driving member; a driven member; a normally disengaged automatic clutch mechanism for coupling said members when said driving member reaches a predetermined speed; a second driven member; means establishing a unidirectional coupling between said driven members, and means for exerting a braking influence upon said first named driven member, whereby said means may be operated to decelerate said first driven member and cause prompt disengagement of said automatic clutch mechanism without effecting a corresponding deceleration of said second driven member.

2. A power transmitting mechanism comprising, a driving member; a driven member; a fully automatic clutch mechanism for coupling said members when said driving member attains a predetermined speed; a second driven member; means coupling said driven members comprising an overrunning clutch, whereby said driving member may be decelerated to a speed below said predetermined speed to cause disengagement of said automatic clutch mechanism without producing deceleration of said second driven member; and means for establishing a bi-directional coupling between said driven members.

3. A power transmitting mechanism comprising, a driving member; a primary driven member; an automatic clutch mechanism for establishing a power transmitting coupling between said members when said driving member attains a predetermined speed; a secondary driven member; means for establishing a two-way coupling between said driven members, and means for establishing a one-way coupling between said driven members for permitting said primary driven member to decelerate below said predetermined speed independently of said secondary driven member to cause disengagement of said automatic clutch mechanism to be effected.

4. A power transmitting mechanism comprising, a driving member, a primary driven member; an automatic clutch mechanism for coupling said members when said driving member attains a predetermined speed; means for exerting a braking influence upon said primary driven member whereby said means may be operated to decelerate said primary driven member to a speed below said predetermined speed and cause prompt disengagement of said automatic clutch mechanism to be effected, a secondary driven member and means whereby said braking means may be also employed to produce deceleration of said secondary driven member.

5. The power transmitting mechanism set forth in claim 4, wherein said driven members are interconnected with a one-way coupling for permitting deceleration of said primary driven member and disengagement of said automatic clutch mechanism independently of said secondary driven member, and wherein said last named means comprises a two-way clutch mechanism for coupling said driven members.

6. A power transmitting mechanism comprising, a driving member; a driven clutch element; an automatic clutch mechanism for coupling said driving member and said driven element when said driving member attains a predetermined speed; a driven member; means for coupling said driven element and said driven member; means for exerting a braking influence upon said driven element; a second driven member; a one-way clutch coupling said driven members, a jaw clutch operably associated with said driven members; and means for actuating said jaw clutch for coupling said driven members.

HENRY H. VAIL.